Feb. 16, 1937.  G. F. FORD ET AL  2,070,723
METHOD AND APPARATUS FOR MAKING FILLERS
Filed Dec. 17, 1935   7 Sheets-Sheet 2
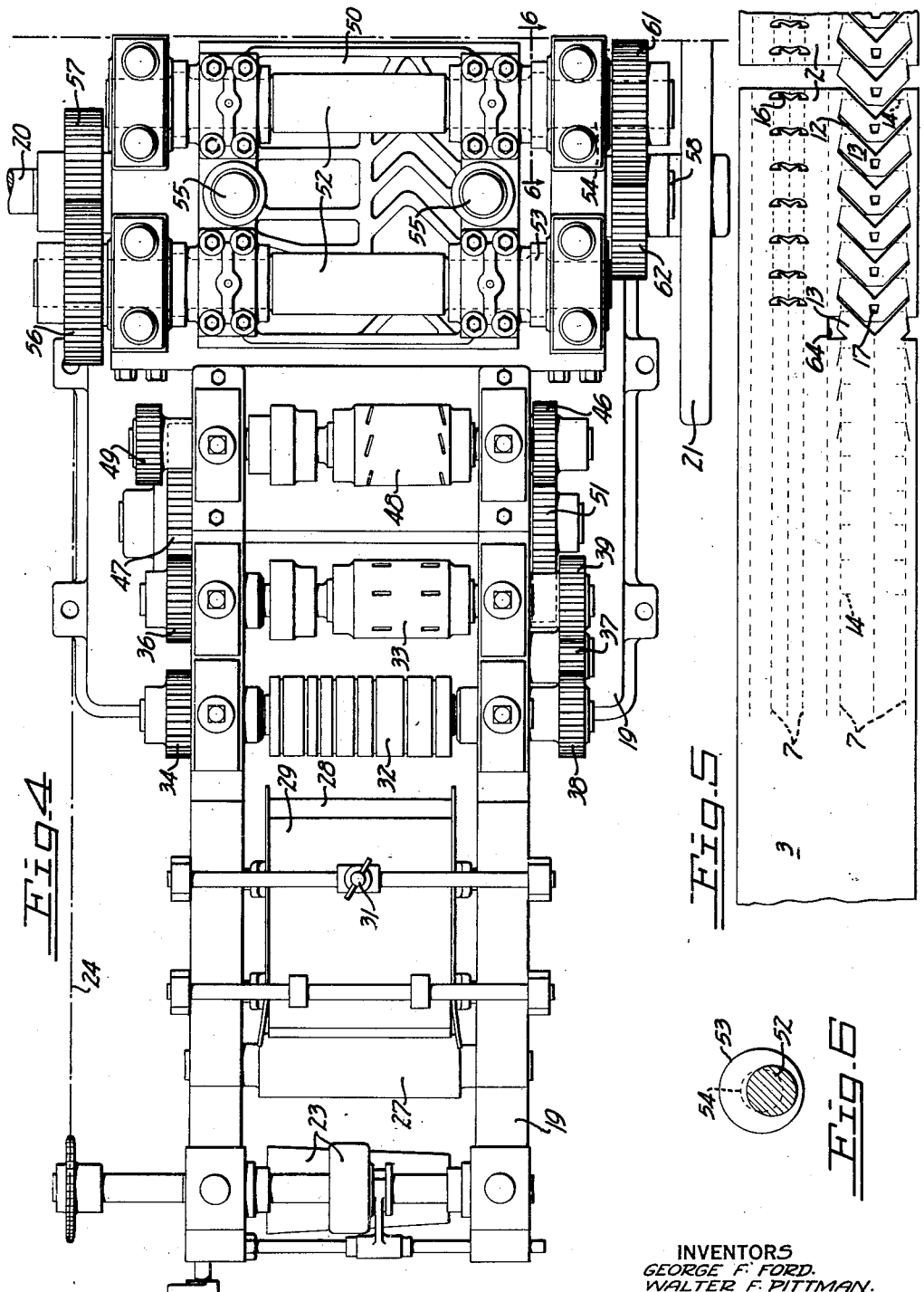
INVENTORS
GEORGE F. FORD.
WALTER F. PITTMAN.
BY Charles S. Evans
THEIR ATTORNEY

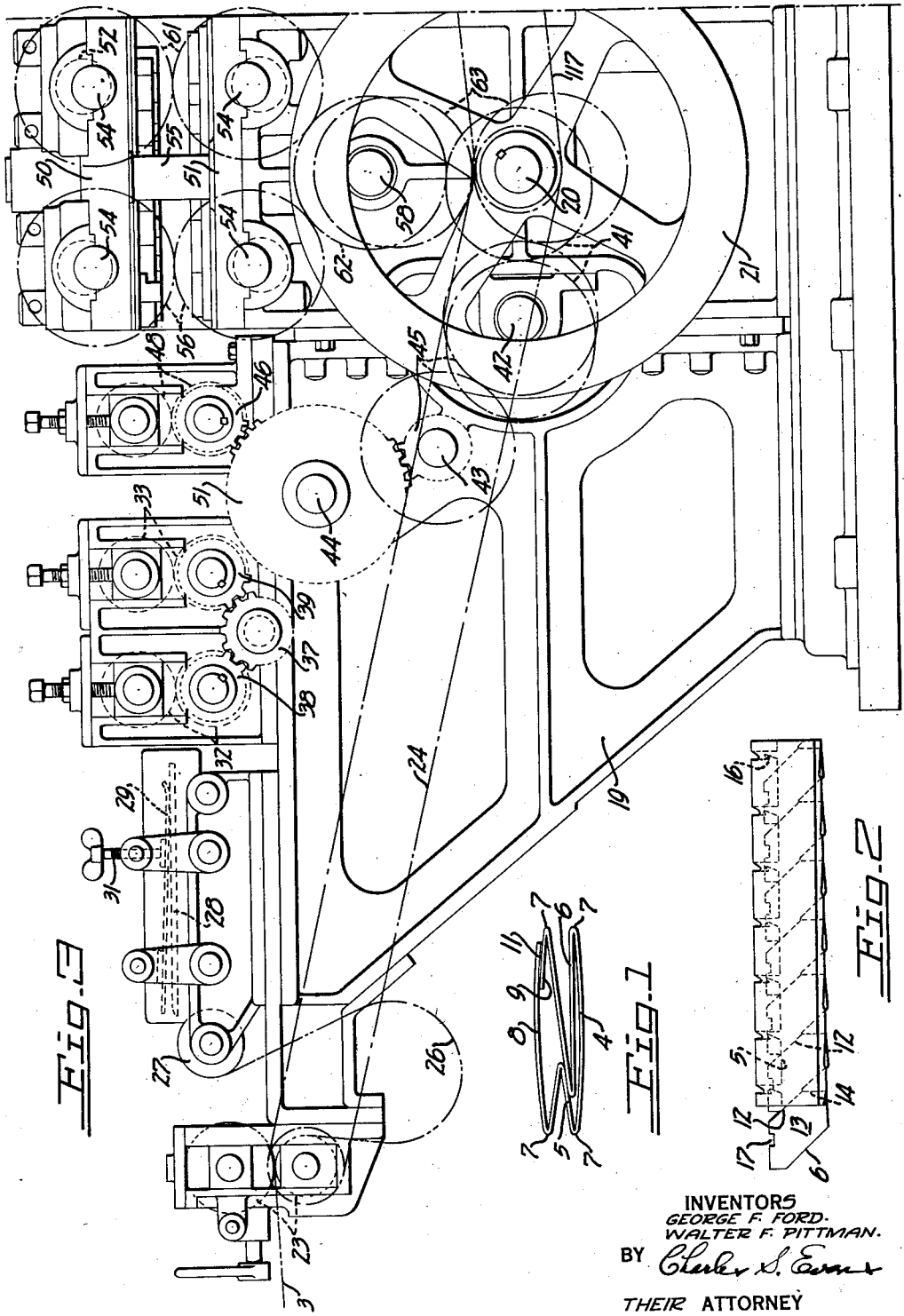

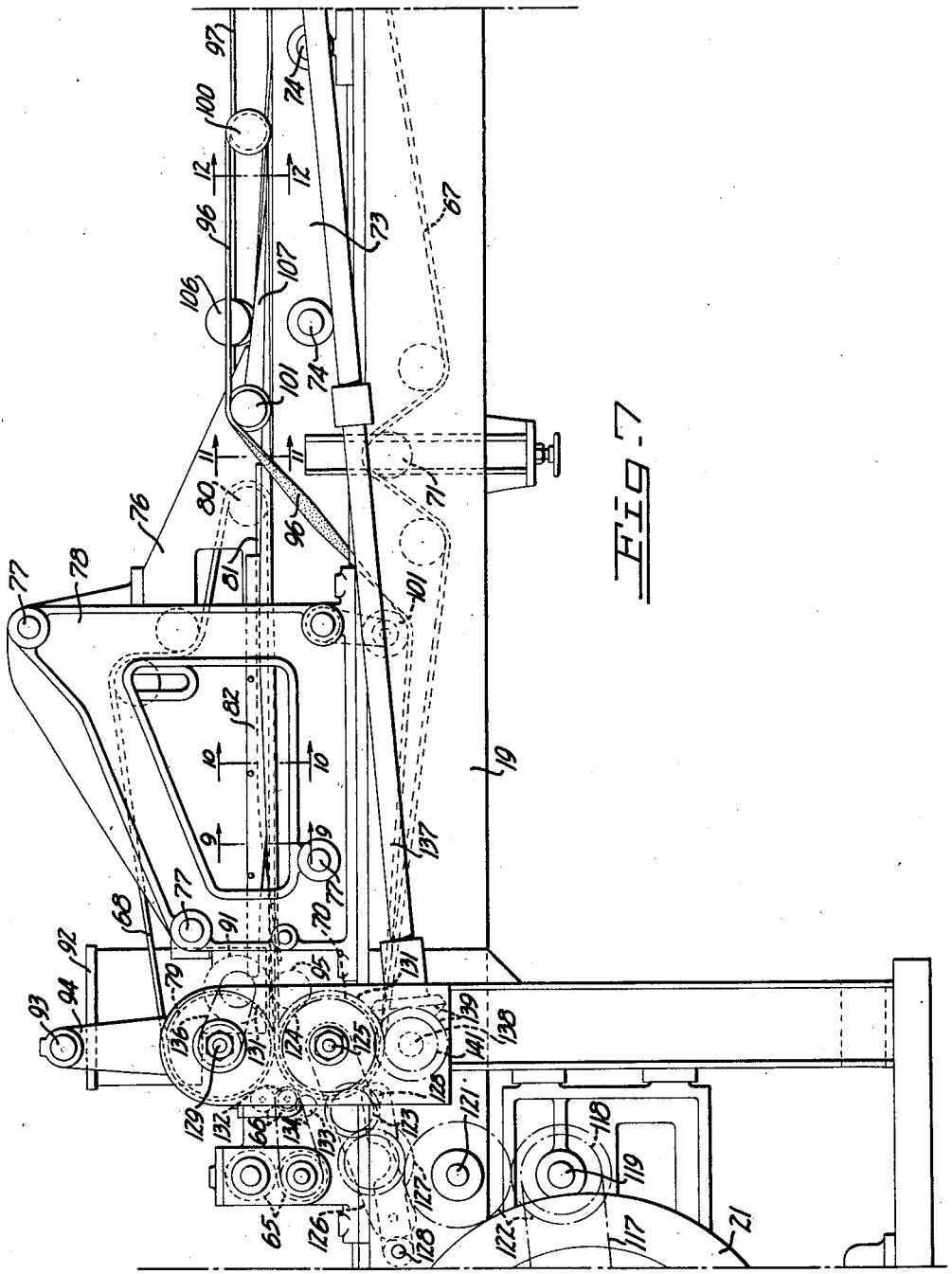

Feb. 16, 1937. G. F. FORD ET AL 2,070,723
METHOD AND APPARATUS FOR MAKING FILLERS
Filed Dec. 17, 1935 7 Sheets-Sheet 4
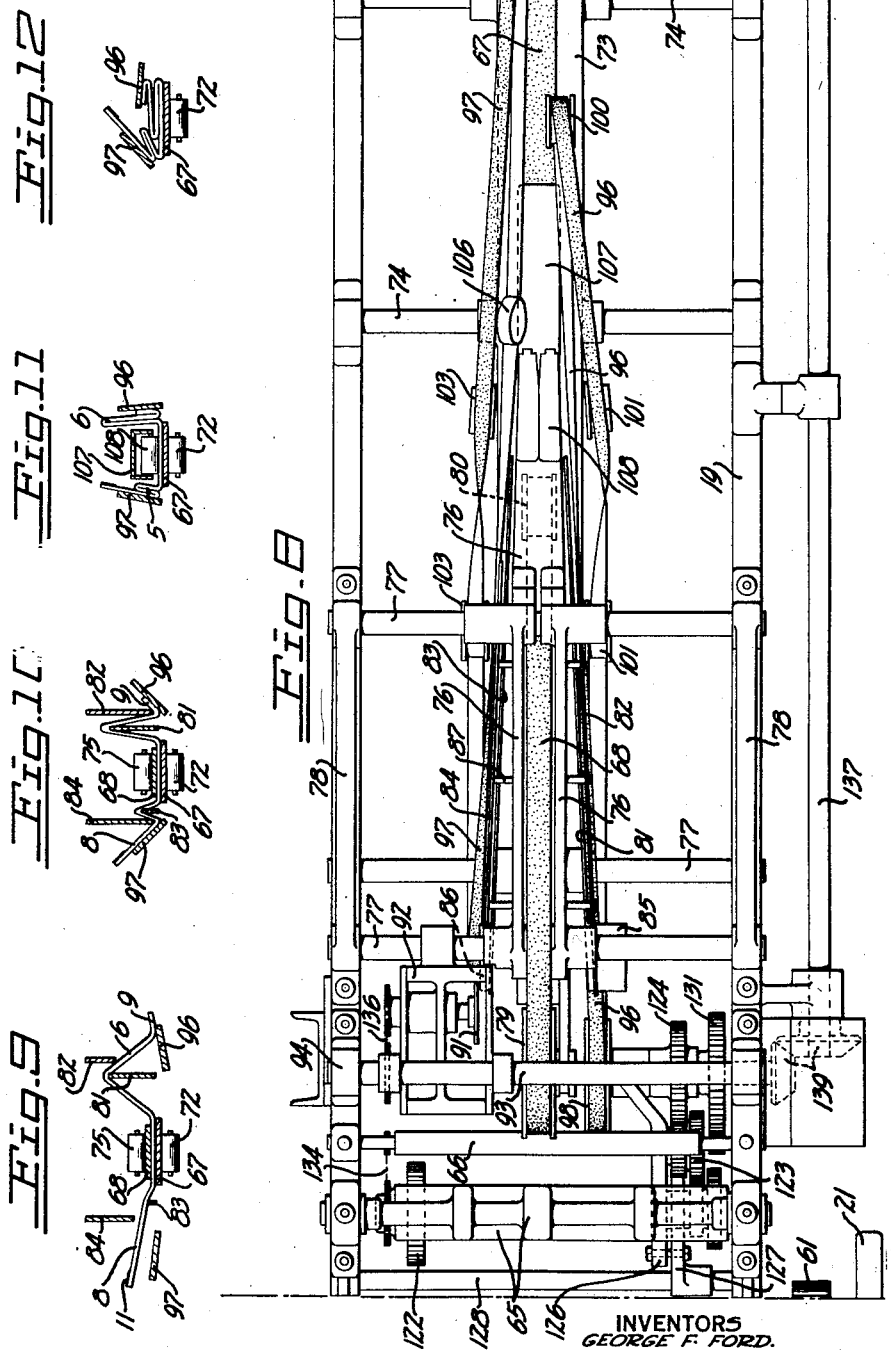
INVENTORS
GEORGE F. FORD.
WALTER F. PITTMAN.
BY Charles J. Evans
THEIR ATTORNEY Feb. 16, 1937. G. F. FORD ET AL 2,070,723
METHOD AND APPARATUS FOR MAKING FILLERS
Filed Dec. 17, 1935 7 Sheets-Sheet 5
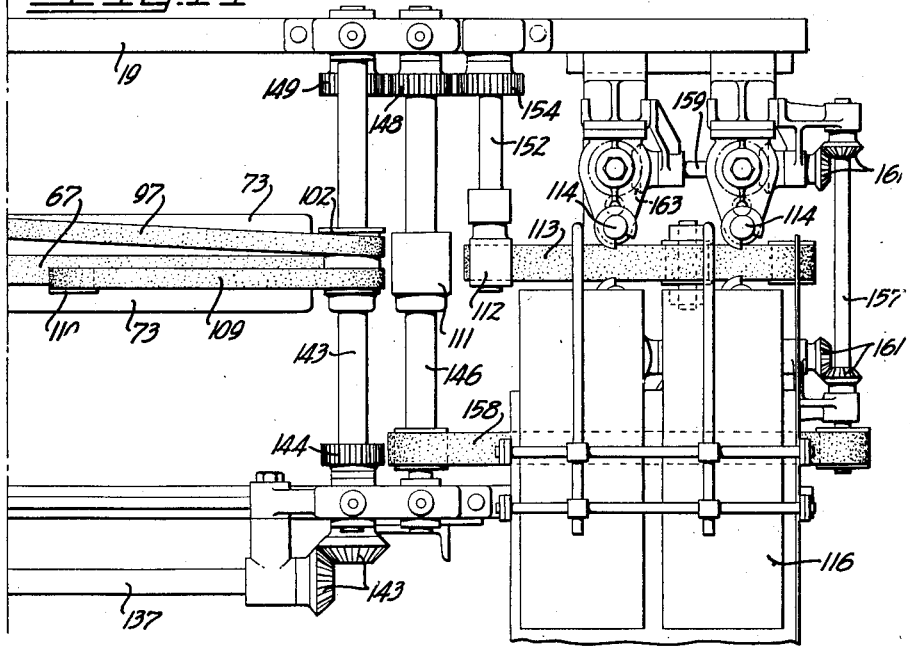
Fig.14
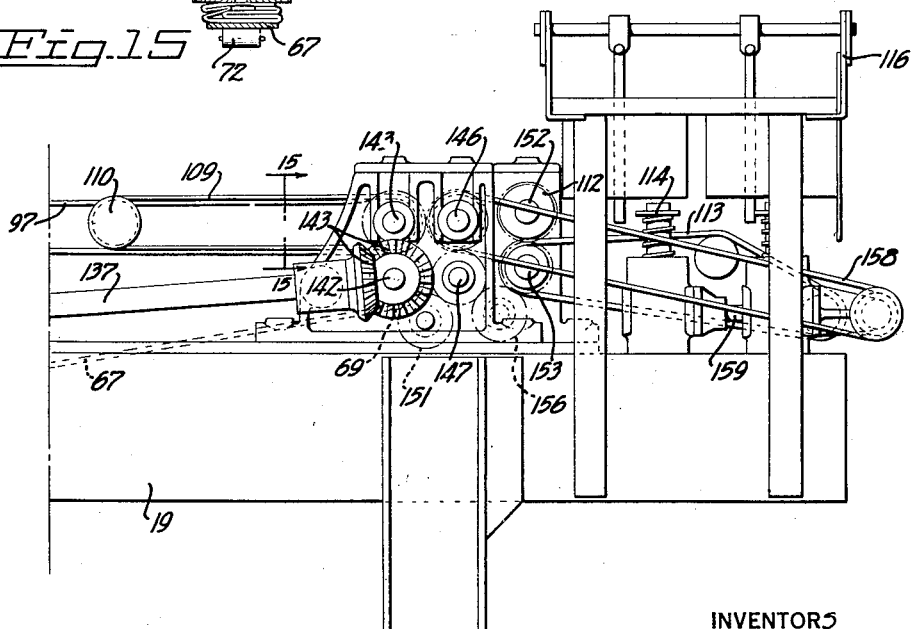
Fig.15
Fig.13
INVENTORS
GEORGE F. FORD.
WALTER F. PITTMAN.
BY Charles N. Evans
THEIR ATTORNEY INVENTORS
GEORGE F. FORD.
WALTER F. PITTMAN.
BY Charles D. Evans
THEIR ATTORNEY Patented Feb. 16, 1937

2,070,723

UNITED STATES PATENT OFFICE 2,070,723

METHOD AND APPARATUS FOR MAKING FILLERS

George F. Ford, Beverly Hills, and Walter F. Pittman, Huntington Park, Calif., assignors to Fibreboard Products, Inc., San Francisco, Calif., a corporation of Delaware Application December 17, 1935, Serial No. 54,818

20 Claims. (Cl. 93—37)

Our invention relates to the manufacture of collapsible egg fillers; and more particularly to a method and apparatus for making a filler which is collapsible into a flat envelope with portions of the filler tucked within the envelope by oppositely disposed infolded gussets.

It is among the objects of our invention to provide a method and apparatus for preparing the filler blanks from sheet material and folding the blanks to form the collapsed fillers in a continuous operation.

Another object of our invention is to provide improved mechanism for scoring, cutting and punching the blanks.

Still another object of our invention is to provide improved means for gathering together portions of the blank to form the gussets and for folding the gussets into the enclosing envelope.

A further object of our invention is to provide means for discharging the collapsed fillers in the form of a stack adapted to be quickly packaged for shipment.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claims.

Referring to the drawings:

Figure 1 is an end view of the collapsed filler made by our machine; and

Figure 2 is a side view of the same.

Figure 3 is an end elevational view of the left portion of the machine; and

Figure 4 is the corresponding plan view.

Figure 5 is a plan view showing the parent sheet material and one of the partially severed blanks. This view is arranged to align the several operations on the sheet with mechanical devices shown in Figure 2.

Figure 6 is a detail sectional view showing the eccentric mounting for the punching head taken in a plane indicated by the line 6—6 of Figure 4.

Figure 7 is a side elevational view of the central portions of the machine; and

Figure 8 is the corresponding plan view.

Figures 9 to 12, inclusive, are detail sectional views showing successive positions of the blank and folding elements during the folding operation. These views are arranged to approximately correspond with the blank as it passes thru the portion of the machine shown in Figure 6; and the planes of section in which the views are taken are further indicated by the lines 9—9, 10—10, 11—11, and 12—12, respectively, in Figure 7.

Figure 13 is a side elevational view of the right hand portion of the machine; and Figure 14 is the corresponding plan view.

Figure 15 is another detail sectional view showing the filler in its finally collapsed position, taken on a plane indicated by the line 15—15 of Figure 13.

Figure 16:
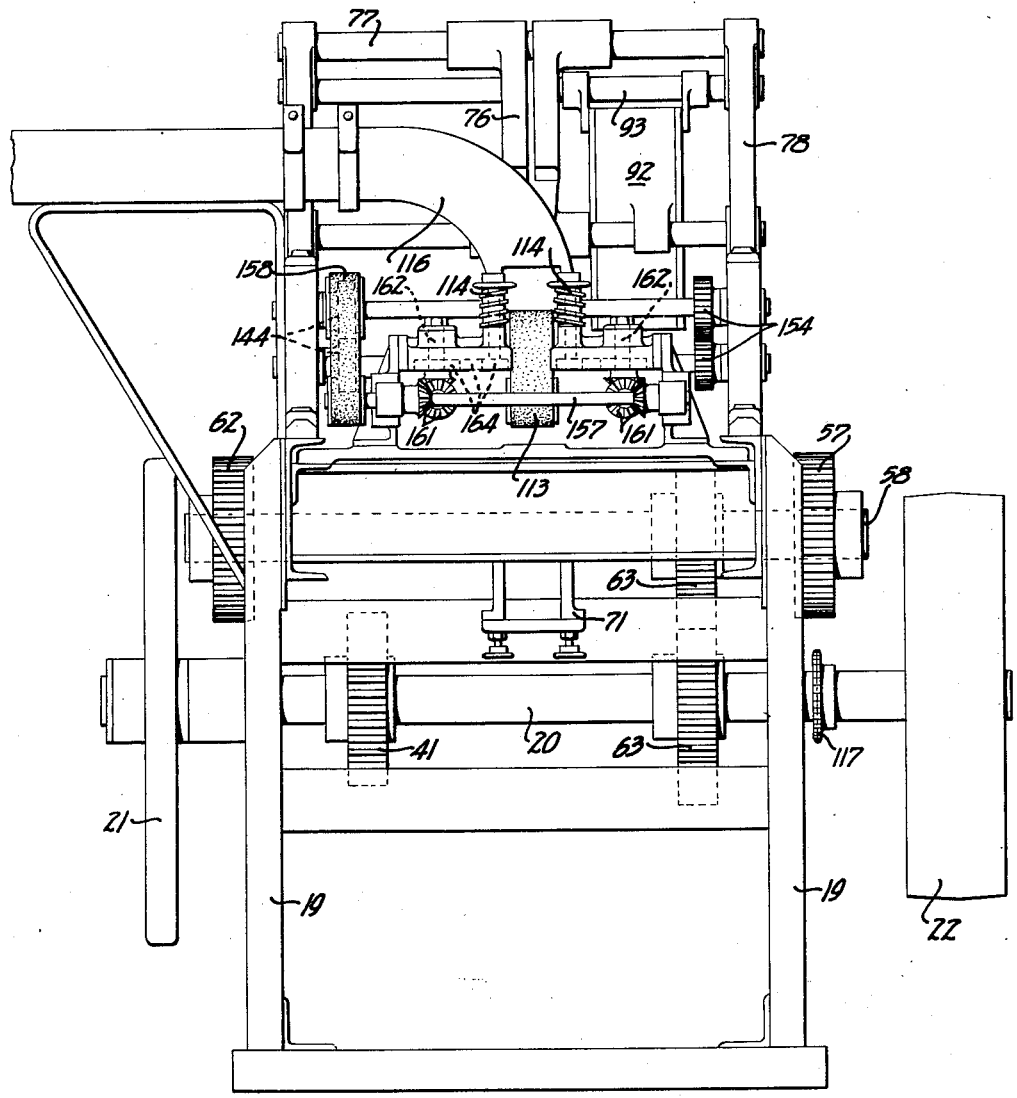

Figure 16 is an end elevational view of the discharge end of the machine.

Figure 17:
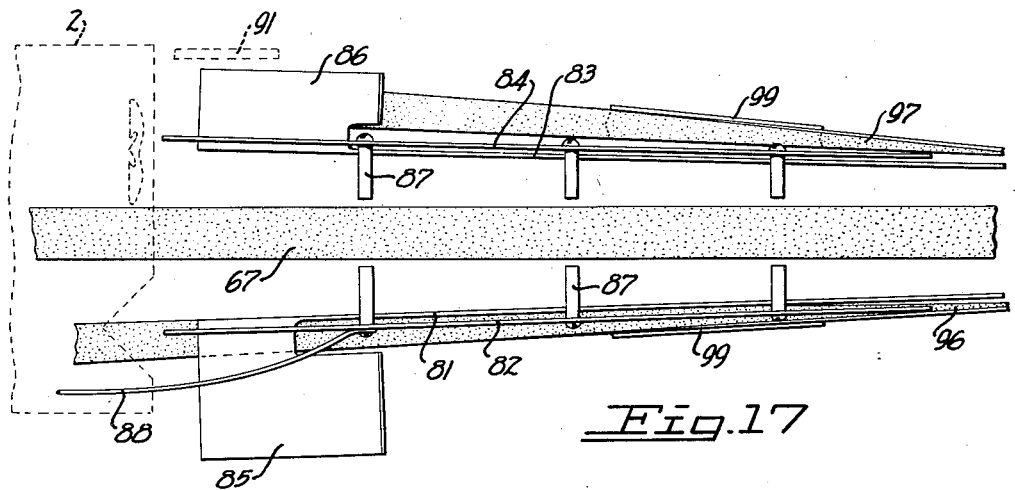

Figure 17 is a detail plan view looking down on the lower conveyor belt and showing the accumulator bars for gathering up the gussets, and also showing the twisted side belts for folding in the gussets and the side edges of the blank.

Figure 18:
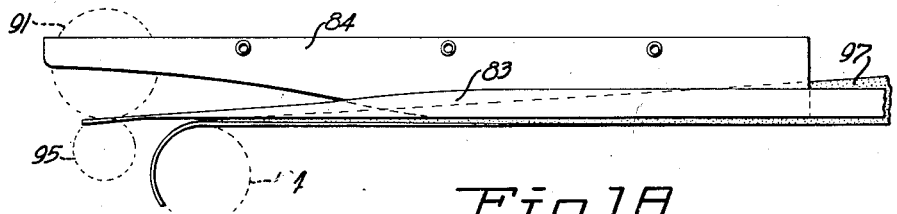
Figure 19:
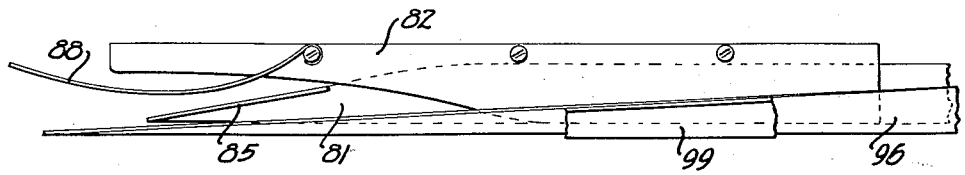

Figure 18 is a detail elevational view looking from the center of the machine toward the rear accumulator bars; and Figure 19 is a detail side elevational view showing the front accumulator bars.

In terms of broad inclusion our method of making collapsed fillers comprises the steps of forming a blank from sheet material, gathering together a portion of the blank to form a gusset, folding the gusset against the blank, folding the edges of the blank inwardly over the gusset, and then gluing the edges together to form a substantially flat envelope with portions of the filler tucked within the envelope by the gusset. The machine for making the collapsed fillers comprises means for scoring a parent strip of sheet material to form a plurality of parallel crease lines, and means for punching the sheet and cutting it into blanks while the sheet is being fed continuously into the machine.

The machine also embodies means for gathering together portions of the blank between the crease lines to form gussets, and means are further provided for folding in the gussets and for simultaneously folding in the side edges of the blank over the gussets to form an envelope. Means are also further provided for gluing the edges of the blank together, and means are arranged at the end of the machine for discharging the collapsed fillers in stacked relation.

In greater detail, our invention relates to the making of a collapsed egg carton filler such as shown in detail in our co-pending application Serial No. 7,946, filed February 25, 1935. This filler is a type having collapsible walls and partitions, adapted to have its walls distended and its partitions erected to provide a cellular egg holding structure.

As shown in Figures 1, 2, and 5, the collapsed filler is folded from a creased blank 2 cut from a parent strip 3 of sheet material. In its collapsed condition the filler is in the form of a substantially flat elongated envelope, having a lower side wall 4, oppositely disposed gussets 5 and 6 folded in from crease lines 7, and an upper side wall formed by the infolded edges 8 and 9. The shorter gusset 5 overlies the longer gusset 6 in the position of the filler shown in Figure 1, and the wider side edge 8 overlaps and is united to the narrower edge 9 by a layer of glue 11.

Referring particularly to Figures 2 and 5, the longer gusset 6 is provided with diagonal slots 12 to form tabs 13 foldably connected to the body of the envelope by crease lines 14. The short gusset 5 of the collapsed wall structure is provided with locking hooks 16, and the tabs 13 formed by the longer gusset are provided with locking apertures 17 for receiving the hooks 16 when the filler is set up. In this partially folded or collapsed condition the fillers may be stacked together compactly for shipment, and it is the purpose of our present invention to provide a machine for producing these fillers in their collapsed state.

With reference to Figures 3 and 4 and 16, our machine comprises a frame 19 providing a horizontal bed upon which the several units for operating on the sheet material are mounted. A main drive shaft 20 carrying a hand wheel 21 and a drive pulley 22 is journalled in the frame. This shaft supplies the drive for all the moving elements in the machine and may be driven from any suitable source of power, preferably from a variable speed prime mover.

The parent strip or web 3 of sheet material is fed into the machine from a suitable supply roll by a pair of feed rolls 23, of which the lower is driven from the shaft 20 by a suitable drive 24. The lower roll is conical, and the upper narrower roll is adjustable longitudinally of it, so that the effective web engaging diameter of the drive roll may be varied to alter the rate of web feed into the machine. See Figure 4. This feed is adjusted so that the web is fed into the machine in a loop 26, from which the web is drawn into the succeeding operating units over a roll 27.

The web first passes thru a tensioning device comprising a lower plate 28, against which the web is pressed by an overlying pivoted plate 29 having an adjusting screw 31. From this tensioning device the web passes between a pair of scoring rolls 32 which form the longitudinal crease lines 7, and then between a second pair of scoring rolls 33 which form the short transverse crease lines 14. These rolls are positively driven and therefore also function as feed rolls. The rolls of each pair are geared together by gears 34 and 36 at the back side of the machine, and the pairs of rolls are connected together at the front side by a gear 37 meshed with suitable gears 38 and 39 on each of the lower roll shafts.

The drive for these rolls is designed to feed the web forwardly with a continuous but varying motion, so that the web moves at a slow rate for one interval and then at a faster rate for the next interval. This is accomplished by a pair of elliptical gears 41 mounted on the drive shaft 20 and on a counter shaft 42. From shaft 42 the drive is continued thru a pair of cross shafts 43 and 44 and a train of gears 45; a gear 47 at the back end of shaft 44 being meshed with the gear 36 to complete the driving connection.

After leaving the scoring roll 33 the web passes between a pair of knived rolls 48 for cutting the short inclined sides of the tabs 13. These rolls are geared together at the back side of the machine by gears 49, and are driven with a fast and slow motion in time with the scoring rolls 32 and 33 by a gear 51 on the front end of shaft 44 and meshed with a gear 46 on the lower roll shaft.

From the cutting rolls the web passes to a punching device comprising upper and lower die carrying heads 50 and 51. These heads are mounted on cross bars 52 journalled off-center in plates 53 provided on the inner end of stub shafts 54. Figures 3, 4, and 6 show this eccentric mounting. The punching heads 50 and 51 are held in alignment by a pair of vertical rods 55 fixed on the lower head and slidable thru the upper head. One pair of the stub shafts 54 are geared together on the back side of the machine by gears 56, one of which is meshed with a driving gear 57 on a cross shaft 58. An opposite pair of the shafts 54 are geared together on the front side of the machine by gears 61, one of which is meshed with a driving gear 62, also on the cross shaft 58. Thus, when shaft 58 is rotated the heads 50 and 51 are caused to move bodily in circular paths about their eccentric axes.

The mounting is such that the punching heads bring the dies together on the web during the advancing portion of their rotation, and then separate the dies during the recovery movement. At the time the dies are working on the web they are also moving forwardly, and this forward speed is so adjusted as to be the same as the web speed at this time. During the recovery movement a new portion of the web must be fed between the punching dies. In order to effect the proper timing, the punching heads are driven in a manner similar to the feed rolls, but in opposite speed relation.

That is, while the punching heads are making a slow recovery movement the feed rolls are rapidly feeding a new portion of the web between the dies; and while the feed rolls are advancing the web at a reduced rate, the heads are accelerated to the web speed. This is effected by driving the shaft 58 from the main shaft 20 thru a pair of elliptical gears 63 so arranged that the short radius of the gear on the main shaft is in mesh when the long radius of the other elliptical gear on the main shaft is in mesh; whereby the shaft 58 is rotating fastest while the shaft 42 is rotating slowest. The dies on the punching heads 50 and 51 are designed to punch out the diagonal tab forming slots 12, the apertures for forming the hooks 16, and the locking apertures 17.

At this time the blank 2 is also partially severed from the parent strip by the cross cut 64. See Figure 5. After the blank has been pushed forwardly and the die comes down again this cross cut is carried across the web to completely sever the blank. The reason for not completely severing the blank during the first punch is to leave a connection with the web to push the blank out from the punching heads.

As shown in Figures 7 and 8, the blank next passes between a pair of feed rolls 65 and then between a pair of corrugated rolls 66, from which the blank passes between a pair of carrier belts 67 and 68. The lower carrier belt has a horizontal upper reach lying in the path of the filler and adapted to engage under the portion of the filler between the gussets. This lower belt extends to the discharge end of the machine where it passes over a pulley 69 and then returns under the frame bed to the pulley 70 at the head end. A suitable tensioning device 71 is preferably provided for the belt. The horizontal reach of this belt is supported by a series of rollers 72 journalled between stringers 73 extending along the central portions of the machine and supported on the frame 19 by cross rods 74. Figures 9 to 12 show these supporting rollers.

The upper carrier belt 68 is only a short belt and has a horizontal lower reach overlying the portion of the blank above the lower belt, so that the blank is grasped between the belts. Backing rollers 75 are also preferably provided above the horizontal reach of this belt, and are journalled in a center bracket 76 supported on cross rods 77 extending from the side brackets 78. The head end of belt 68 is carried by a pulley 79 mounted directly above the pulley 70, and the other end is supported by a pulley 80 mounted in a center bracket 76. A suitable tightener is also preferably provided for this belt.

As the blank is advanced between these belts the gussets 5 and 6 are formed by lifting up and gathering together the portions of the blank between the parallel crease lines 7. As shown in Figures 9, 10, 17, 18, and 19, this forming of the gussets is accomplished by accumulator bars 81 and 82 on the forward side of the carrier belts, and similar bars 83 and 84 on the back side. The lower bars 81 and 83 have upwardly sloping forward edges for gradually elevating the blank at the ridges of the gussets, and the upper side bars 82 and 84 have downwardly sloping edges for gradually pressing down the outer edges of the blank as the material is lifted by the lower accumulator bars.

As shown in Figure 17, the accumulator bars angle inwardly toward the carrier belts as the folding progresses. This is to allow for the crowding in of the gussets as the material is gathered together. Inclined plates 85 and 86 are preferably provided along the forward portions of the lower bars 81 and 83, and these plates are notched back under the upper bars to assist in starting the fold. The upper bars are fastened to the central bracket 76 by pins 87, and the lower bars are supported by suitable cross rods in the frame.

Since the gusset 6 is the tallest, it is elevated first. Figure 19 shows how the forward edge of the accumulator bar 81 rises rapidly as compared with that of the bar 83 on the opposite side shown in Figure 18. Figure 9 shows a stage in the folding where the longer gusset is practically formed before the other is well started. In order to further assist the starting of the fold, a curved wire depressing element 88 may be mounted on the end of the upper accumulator bar, as shown in Figure 19.

Means are provided for applying a narrow band of glue 11 along the wide edge 8 of the blank. This is done by a glue wheel 91 running in a pot 92 suspended alongside the upper carrier belt on one of the tie rods 77 and also on a cross rod 93 supported on standards 94. The glue wheel 91 is disposed to apply the glue to the outer edge of the blank as the latter is entering the accumulator bars. A suitable roller 95 is also provided to support the outer edge of the blank under the glue wheel.

Means are further provided for folding in the side edges 8 and 9, and for simultaneously folding in the upstanding gussets. For this purpose twisted belts 96 and 97 are provided alongside the carrier belts. These side belts also angle inwardly to follow the inward movement of the material as the gussets are gathered up. Belt 96 along the front side is a short belt, terminating beyond the end of the upper carrier belt 68.

The head end of this side belt passes over a pulley 98, and the upper horizontal reach then gradually twists inwardly to an upright position against the accumulator bars. As shown in Figure 19, a backing plate 99 may be provided to assist in positioning the belt. The inside reach finally turns completely over to a horizontal position and passes back over a pulley 100 mounted on one of the center stringers 73. Figures 9 to 12 show the manner in which the inner reach of this belt folds in the edge 9 and gusset 6. In order to twist the belt back again it is carried down alongside the first reach on a pair of inclined flanged rollers 101, one of which is adjustable to tension the belt.

The other side belt 97 is longer and extends to the end of the lower carrier belt, where it passes over a pulley 102 and then returns back and down alongside the first reach over a pair of inclined flanged rollers 103. As shown in Figure 18, the head end of the inside reach comes off a pulley 104 behind the glue wheel 91, and then twists inwardly against the accumulator bars, and finally turns completely over to a horizontal position. An idler roll 106 is preferably provided for assisting in holding the long reach in position. Because of its being longer, belt 97 does not turn over as quickly as belt 96. As a result, the long gusset 6 and narrow edge 9 are folded down ahead of the gusset 5 and edge 8. Figures 10 to 12 show the folding relationship and the manner in which the short gusset 5 and wide edge 8 are folded down on top.

As the blanks come out from under the upper carrier belt 68 they pass under a shoe 107 pressed down by spring arms 108 fastened to the sloping forward end of the center bracket 76. Rollers 108 are journalled along the bottom of the shoe to ride on the blanks. See Figure 11. As shown in Figure 7, the shoe 107 tapers downwardly toward its toe, which permits the gussets to be folded inwardly for a considerable distance before the blank has to be brought out from under the shoe.

After coming out from under the short side belt 96, the wide edge 8 of the blank is brought down to overlap the narrow edge 9, and the glue 11 is pressed into contact with the underlying edge by the action of belt 97. Finally the collapsed filler passes under a short side belt 109 having a horizontal lower reach arranged to press down on the glued surfaces. One end of this belt passes over the pulley 102 and the other end over a pulley 110 mounted on one of the center stringers 73.

Upon coming out from between the belts, the filler passes between a pair of pressure rolls 111 and then under a roll 112 onto a conveyor belt 113 which feeds the fillers into pairs of elevating screws 114. The threads of these screws engage the edges of the filler and elevate it into a shute 116 which delivers the fillers in stacked relation for packing.

The drive for the various belts and rollers in the folding part of the machine is taken from the main drive shaft 20 by a chain 117 running over a sprocket 118 on a cross shaft 119. This shaft is connected to a second shaft 121 by gears 122. From shaft 121 the drive is continued thru a train of reduction gears 123 to a gear 124 on shaft 125 carrying the drive pulleys 98 and 70 of the belts 96 and 67. The train of gears 123 is mounted on an arm 126 supported at one end on the shaft 125 and at the other end on a bar 127 braced between a pair of cross rods 128 in the frame. Of course any suitable drive connection could be provided between the main shaft 20 and the pulley shaft 125; the arrangement of gears shown being merely for convenience in the particular construction illustrated.

Shaft 129 carrying the drive pulley 79 of belt 68 is connected with the lower pulley shaft 125 by a pair of gears 131. The lower of these gears is also connected with a pinion 132 on the lower roller 66 thru a reversing gear 133; while the lower roller feed roll 65 is preferably connected with the driven roll 66 by a chain drive 134. A chain drive 136 is also provided between the upper pulley shaft 129 and the glue wheel 91. This completes the drive for the elements at the head end of the folding unit.

The mechanism at the foot of the machine is driven by a shaft 137 extending along the forward side of the machine. This shaft is connected with a cross shaft 138 under the pulley shaft 125 by bevel gears 139; and the lower cross shaft is drivably connected with the pulley shaft by a gear 141 meshed with gear 131. Near the end of the machine another cross shaft 142 is provided and is drivably connected to the longitudinal shaft by bevel gears 143. Shaft 142 carries the pulley 69 of belt 67, so that this carrier belt is positively driven at both ends.

Directly above the shaft 142 is another cross shaft 143 connected to it by a pair of gears 144. The upper shaft 143 carries the drive pulley 102 for belts 97 and 109. Immediately ahead of these shafts are another pair of shafts 146 and 147 carrying the feed rolls 111. These latter shafts are geared together by gears 148, and are driven from a gear 149 on shaft 142 thru a reversing gear 151. A pair of short shafts 152 and 153 are also provided ahead of the roll shafts, the upper carrying the roll 112 and the lower carrying the pulley for conveyor belt 113. These shafts are also geared together by gears 154 and are driven from the lower gear 148 thru a reversing gear 156.

The elevating screws 114 are driven from a cross shaft 157 at the end of the machine and connected to shaft 146 by a driving belt 158. From shaft 157 the drive is carried to the screws by shafts 159 rotated thru bevel gears 161. Short vertical shafts 162 are provided alongside the screws and are driven from shafts 159 thru pairs of bevel gears 163. The screws are connected to the vertical shafts by small trains of gears 164.

We claim:

1. A machine for making a collapsed filler from a blank having parallel crease lines, comprising means for gathering together a portion of the blank between a pair of said crease lines to form a gusset, means for gathering together another portion of the blank between a second pair of crease lines to form another gusset, means for folding one of the gussets inwardly against the blank and simultaneously folding an edge of the blank inwardly over the folded gusset, and means for folding the other gusset over the first gusset and simultaneously folding the other edge of the blank inwardly over both gussets.

2. A machine for making a collapsed filler from a blank having parallel crease lines, comprising means for gathering together a portion of the blank between a pair of said crease lines to form a gusset, means for gathering together another portion of the blank between a second pair of crease lines to form another gusset, means for folding one of the gussets inwardly against the blank and simultaneously folding an edge of the blank inwardly from a crease line at the base of the gusset being folded, and means for folding the other gusset over the first gusset and simultaneously folding the other edge of the blank from a crease line at the base of said other gusset to overlap the first infolded edge, and means for gluing the edges together.

3. A machine for making a collapsed filler from a blank having parallel crease lines, comprising means for moving the blank, means arranged in the path of movement of the blank for gathering together a portion of the blank between a pair of said crease lines to form a gusset, and a belt for folding the gusset against the blank.

4. A machine for making a collapsed filler from a blank having parallel crease lines, comprising means for moving the blank, means arranged in the path of movement of the blank for gathering together a portion of the blank between a pair of said crease lines to form a gusset, and a twisted belt for folding the gusset against the blank.

5. A machine for making a collapsed filler from a blank having parallel crease lines, comprising means for moving the blank, a bar having an inclined edge over which the blank may pass for elevating and gathering together a portion of the material between a pair of crease lines to form a gusset, and means for folding the gusset against the blank.

6. A machine for making a collapsed filler from a blank having parallel crease lines, comprising means for moving the blank, a bar having an inclined edge over which the blank may pass for elevating and gathering together a portion of the material between a pair of crease lines to form a gusset, a belt for folding the gusset against the blank and simultaneously folding an edge of the blank over the gusset, and a second belt for folding the opposite edge to overlap the first folded edge.

7. A machine for making a collapsed filler from a blank having parallel crease lines, comprising means for moving the blank, a pair of spaced bars having inclined edges over which the blank may pass for elevating and gathering together portions of the blank between pairs of said crease lines to form a pair of gussets, and belts for folding the gussets against the blank.

8. A machine for making a collapsed filler from a blank having parallel crease lines, comprising means for moving the blank, a pair of spaced bars having inclined edges over which the blank may pass for elevating and gathering together portions of the blank between pairs of said crease lines to form a pair of gussets, belts for folding the gussets against the blank and for simultaneously folding the edges of the blank over the gussets.

9. A machine for making a collapsed filler from sheet material, comprising means for forming parallel crease lines in the sheet, means for cutting the sheet into blanks, means for receiving a blank and gathering together a portion of the blank between a pair of the crease lines to form a gusset, and means for folding the gusset against the blank.

10. The method of making a collapsed filler from a blank of sheet material, which comprises gathering together portions of the blank to form a pair of substantially parallel upstanding gussets, folding the gussets inwardly over the portion of the blank between the gussets, folding the edges of the blank inwardly over said gussets, and gluing said edges together.

11. The method of making a collapsed filler from a blank of sheet material, which comprises gathering together portions of the blank to form a pair of substantially parallel upstanding gussets, folding the gussets inwardly over the portion of the blank between the gussets, and simultaneously folding the edges of the blank inwardly over said gussets, and gluing said edges together.

12. A machine for making a collapsed filler from a blank, comprising conveyor means engaging opposite sides of the blank to hold the latter and for moving the blank through the machine, means disposed on each side of the conveyor means for elevating and gathering together portions of the blank to form a pair of upstanding gussets, and means for folding the gussets inwardly.

13. A machine for making a collapsed filler from a blank, comprising a pair of belts engaging opposite sides of the blank to hold the latter and for moving the blank through the machine, means disposed on each side of the belts for elevating and gathering together portions of the blank to form a pair of upstanding gussets, and means for folding the gussets inwardly.

14. A machine for making a collapsed filler from a blank, comprising conveyor means engaging opposite sides of the blank to hold the latter and for moving the blank through the machine, a pair of tapered bars arranged on edge alongside the conveyor means for elevating and gathering together portions of the blank to form a pair of upstanding gussets, and means for folding the gussets inwardly.

15. A machine for making a collapsed filler from a blank, comprising conveyor means engaging opposite sides of the blank to hold the latter and for moving the blank through the machine, a pair of bars overlying the blank and arranged on edge alongside the conveyor means for holding down the outer portions of the blank, a pair of tapered bars arranged on edge between the hold down bars and the conveyor means for elevating and gathering together portions of the blank to form a pair of upstanding gussets, and means for folding the gussets inwardly.

16. A machine for making a collapsed filler from a blank, comprising conveyor means engaging opposite sides of the blank to hold the latter and for moving the blank through the machine, a pair of bars overlying the blank and arranged on edge alongside the conveyor means for holding down the outer portions of the blank, a pair of tapered bars arranged on edge between the hold down bars and the conveyor means for elevating and gathering together portions of the blank to form a pair of upstanding gussets, and a pair of belts for folding the gussets inwardly.

17. A machine for making a collapsed filler from a blank, comprising conveyor means engaging opposite sides of the blank to hold the latter and for moving the blank through the machine, a pair of bars overlying the blank and arranged on edge alongside the conveyor means for holding down the outer portions of the blank, a pair of tapered bars arranged on edge between the hold down bars and the conveyor means for elevating and gathering together portions of the blank to form a pair of upstanding gussets, and a pair of twisted belts for folding the gussets inwardly.

18. A machine for making a collapsed filler from a blank, a conveyor belt underlying the blank for advancing the latter through the machine, a tapered shoe for holding the blank against the belt, means for elevating and gathering together a portion of the blank to form an upstanding gusset adjacent a side of said belt, and means for folding the gusset inwardly over the tapered end of the shoe.

19. A machine for making a collapsed filler from a blank, a conveyor belt underlying the blank for advancing the latter through the machine, a tapered shoe for holding the blank against the belt, means for elevating and gathering together a portion of the blank to form an upstanding gusset adjacent a side of said belt, and a twisted belt extending edgewise alongside the conveyor belt and turning inwardly over the tapered end of said shoe to a horizontal position overlying the conveyor belt for folding the gusset inwardly over the portions of the blank overlying the conveyor belt.

20. A machine for making a collapsed filler from a blank, a conveyor belt underlying the blank for advancing the latter through the machine, means for elevating and gathering together a portion of the blank to form an upstanding gusset adjacent a side of said belt, and a twisted belt extending edgewise alongside the conveyor belt and turning inwardly to a horizontal position overlying the latter for folding the gusset and an edge of the blank inwardly over the portions of the blank overlying the conveyor belt.

GEORGE F. FORD,
WALTER F. PITTMAN.